United States Patent [19]

Goldberg

[11] 4,241,987
[45] Dec. 30, 1980

[54] APPARATUS FOR OPTIMIZING CAMERA IMAGE SURFACE TO IMAGE RECEIVING SURFACE

[75] Inventor: Norman N. Goldberg, Madison, Wis.

[73] Assignee: Ziff-Davis Publishing Company, New York, N.Y.

[21] Appl. No.: 106,658

[22] Filed: Dec. 26, 1979

[51] Int. Cl.³ .................. G03B 3/00; G03B 17/00
[52] U.S. Cl. .................................. 354/195; 354/203
[58] Field of Search .................. 354/195–201, 354/203

[56] References Cited

U.S. PATENT DOCUMENTS

| 3,386,359 | 6/1968 | Gentile | 354/203 |
| 3,563,144 | 2/1971 | Fukino | 354/203 |
| 3,738,241 | 6/1973 | Bahnsen | 354/195 |

FOREIGN PATENT DOCUMENTS

| 423350 | 4/1911 | France | 354/195 |

Primary Examiner—John Gonzales
Attorney, Agent, or Firm—Isaksen, Lathrop, Esch, Hart & Clark

[57] ABSTRACT

Apparatus is disclosed suitable for installation in a camera for optimizing the relationship of the image surface of the camera relative to the image receiving surface, such as film, of the camera for different adjustments of the focusing lens and the aperture setting. The adjustment is made by moving the image receiving surface, i.e., the film, to a best fit relationship to the image surface of the lens, with the movement of the film being made after the trip button of the camera is depressed and with the adjustment of the extent of movement of the film being instantaneously responsive to the positions of the focus and aperture settings. The apparatus disclosed is also suitable for use in a general purpose camera as a mechanism for flattening and holding the film in a fixed, predetermined position.

28 Claims, 7 Drawing Figures

APPARATUS FOR OPTIMIZING CAMERA IMAGE SURFACE TO IMAGE RECEIVING SURFACE

TECHNICAL FIELD

The present invention relates generally to cameras and, more particularly, to cameras having an adjustable lens system, an image surface created by the lens arrangement of the camera, and an image receiving surface intended to receive the image surface thereon.

BACKGROUND OF THE PRIOR ART

In camera technology the purpose of the lens system of the camera is to focus an image of an object on the image receiving surface, i.e., the film, of the camera. All practical lens systems used in cameras generate an "image surface" which is not a perfect plane but includes aberrations and other imperfections, and these imperfections normally result in a less than optimum fit between the image surface and the image receiving surface. In attempting to optimize the relationship between these two surfaces, two approaches may be used. One approach, which is disclosed in U.S. Pat. No. 4,168,116, to the applicant herein, is a method and apparatus for achieving this optimization by adjustment of the image surface to a best fit relationship to the image receiving surface. No system is known in the prior art in which the image receiving surface is moved into a best fit relationship with the image surface.

There are cameras in the prior art which include structure therein to relieve tension from the pressure plate biased against the film during the film wind cycle so that the film may more easily be wound. Cameras having such devices are currently manufactured under the brand name Minox and Omega 120. There has also been one camera on the market manufactured and sold under the name Stereo Realist which focused the camera by moving the entire film support plate to a predetermined position. However, the mechanical apparatus utilized by such prior art cameras to move the film to the desired position bears no resemblance to the apparatus disclosed and illustrated herein.

SUMMARY OF THE INVENTION

The present invention is summarized in that in a camera having a lens assembly including focus setting and aperture setting adjustment mechanisms and creating an image surface, and having an image receiving surface, apparatus is provided for optimizing the image surface to the image receiving surface including: a detecting device instantaneously responsive to the settings of the focus setting and aperture setting adjustment mechanisms; a linkage connected to the detecting device; and an image surface adjustment mechanism operated by the linkage to vary the position of the image receiving surface relative to the lens assembly to move the image receiving surface to a best fit relationship with the image surface.

It is an object of the present invention to provide an apparatus for optimizing the relationship between the image surface and the image receiving surface of a camera in which the optimization is achieved by moving the image receiving surface into the best fit relationship with the image surface.

It is another object of the present invention to provide such an apparatus for so optimizing the image surface to the image receiving surface in which the detecting of the necessary adjustment and the achieving of the necessary adjustment are all accomplished in a very brief period of time so that the adjustment can be accomplished after the depression of the trip button of the camera and before the exposure of the film.

It is another object of the present invention to provide a mechanism for positioning and holding the film of a camera so that the film is held in a flat, planar configuration and is positioned at a predetermined position within the camera to aid in the general image accuracy of the camera.

It is yet another object of the present invention to provide an electrical apparatus for detecting the adjustment necessary to optimize the image surface to the image receiving surface.

Other objects, advantages, and features of the present invention will become apparent from the following specification when taken in conjunction with the accompanying drawings.

DETAILED DESCRIPTION OF THE PREFERRED EMBODIMENT

Figure 1:
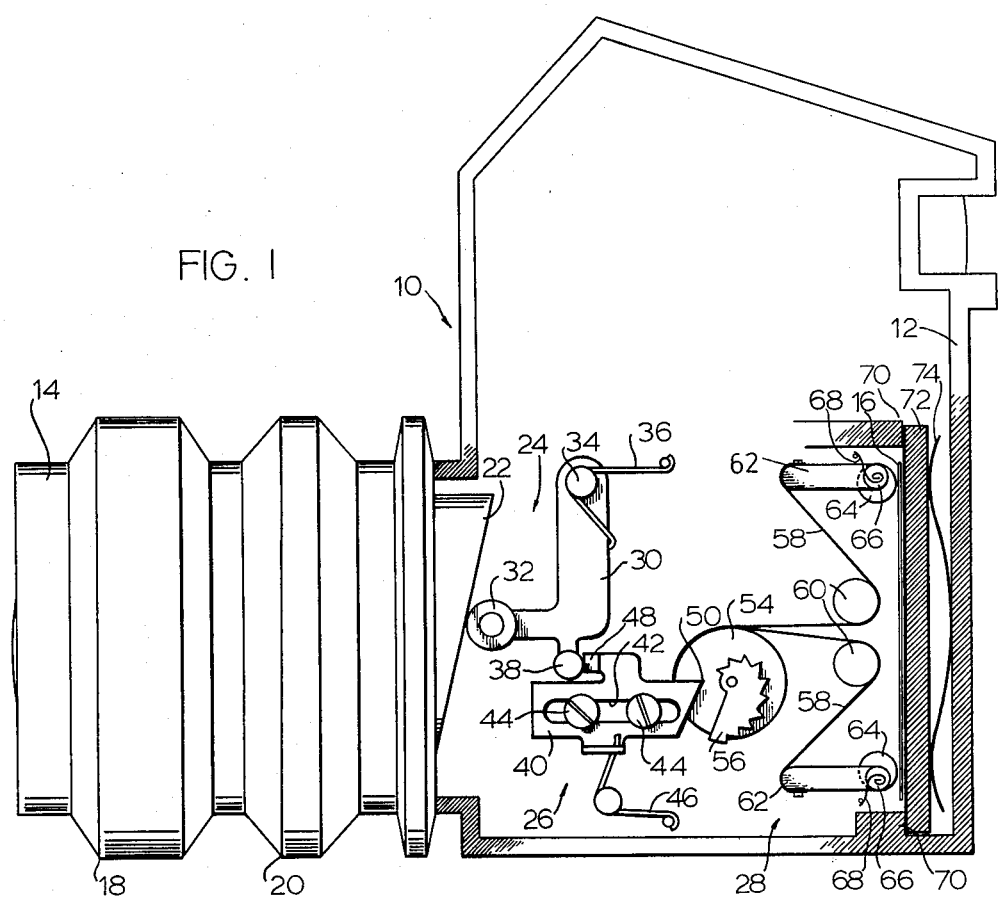
FIG. 1 is a side cross-sectional schematic view of a camera utilizing therein the apparatus for optimizing the image surface to the image receiving surface constructed in accordance with the present invention.

Shown in FIG. 1 is a camera, generally indicated at 10, shown in a simplified schematic form and including therein apparatus for optimizing the image surface to the image receiving surface constructed in accordance with the present invention. For purposes of this illustration, the exterior housing and body 12 of the camera is shown in part in phantom in FIG. 1, and it is to be understood by this that the precise construction of such part is not critical to the present invention and that generally standard camera structure can be utilized there. Mounted on the front of the camera housing 12 is a lens assembly 14 which is arranged so as to focus an image of a desired object generally in the direction of an image receiving surface 16, which, in the instance of the single lens reflex camera generally illustrated herein, is the film plane of the film used in the camera. For purposes of this illustration, it is assumed that the image receiving surface 16 is exactly perpendicular to the long, or optical, axis of the lens assembly 14. That lens assembly 14 includes a focusing collar 18 which has an adjustable setting mechanism so as to allow the lens to bring objects of varying distances into focus in the general position of the image receiving surface 16. The lens assembly 14 also includes an aperture selecting mechanism in the form of a ring or collar 20 which is utilized to allow the adjustment of the lens aperture to the desired f-stop. In the camera illustrated at 10, as is common in many of the cameras constructed at the present time, it is generally envisioned that the aperture selecting ring 20 will have a setting for "automatic" in which the aperture setting of the camera will be automatically selected by the camera so as to provide a proper exposure on the film in conjunction with an exposure time setting which is either preselected by the photographer or automatically selected by the camera. Formed at the rear end of the lens assembly 14 is a lens setting adjustment indicating device in the form of a cam surface 22. The cam surface 22 is at all times rotated to a position consistent with the focal length of the lens assembly 14 and with the instantaneous setting of the focusing collar 18 and the aperture selecting ring 20 so as to reflect the degree of image receiving surface adjustment necessary to optimize the image surface to the image receiving surface. The manner in which the cam surface 22 may be responsive to the focal length of the lens and the settings of the focusing collar 18 and the aperture selecting ring 20 may be similar to that shown in U.S. Pat. No. 4,168,116 to the inventor of the present application, the disclosure of which is hereby incorporated herein by reference.

The remaining structural details of a single lens reflex camera including therein the apparatus of the present invention is omitted from FIG. 1. It is understood that such other details, including the reflecting mirror, a focusing screen, a field lens and other such structural components may be constructed within a camera utilizing the apparatus according to the present invention in an otherwise conventionally known manner, and therefore will not be described in further detail herein.

Within the camera 10, there is provided a detecting device, generally indicated at 24, a linkage, generally indicated at 26, and an image surface adjustment mechanism, generally indicated at 28. In the operation of the camera 10, the detecting device 24 is responsive to the positions of the cam 22, and the linkage 26 is operated by the detecting device 24 and in turn acts to operate the adjusting mechanism 28 to move the image receiving surface 16 to a position so as to optimize the relationship between the image surface and the image receiving surface 16. This general operation and the structure of these components will now be described in more detail.

The detecting device 24 includes the cam surface 22 and a cam follower 30 having a roller 32 located thereon with the roller 32 pressed into continuous contact with the cam surface 22. The cam follower 30 is pivoted at its upper end about a pivot pin 34 and has a spring 36 attached thereto so as to bias the cam follower 30 to pivot about the pivot pin 34 in a generally clockwise direction as viewed in FIG. 1. This pivoting of the cam follower 30 causes the roller 32 to be constantly pressed against the cam surface 22. At its lower end, the cam follower 30 is provided with a linkage pin 38 which together with a slide lever 40 makes up the linkage 26. The slide lever 40 has formed in it an elongated slot 42 which is received over a pair of retaining screws 44 so that the slide lever 40 is allowed to slide freely in a lateral direction while being restrained from pivoting or tilting. A biasing spring 46 is provided to bias the slide lever 40 in the left-hand direction, as viewed in FIG. 1, so as to constantly urge an abutment arm 48 of the slide lever 40 against the linkage pin 38 of the cam follower 30. At its end opposite from the abutment arm 48, the slide lever 40 is provided with a pointed engaging surface 50.

The image receiving surface adjusting mechanism 28 is, in the case of the camera illustrated in FIG. 1, a film position adjusting mechanism inasmuch as in the camera 10 the image receiving surface is the film, which is indicated at 16 in FIG. 1 and which is, in this case, received in roll form. The image receiving surface adjusting mechanism 28 includes a rotatable drum 54 having a stop plate 56 attached to the side thereof. The stop plate 56 is a generally spiral-shaped boss having a series of teeth formed in its spiral edge surface. Wound around and attached to the drum 54 are a pair of straps 58. Each of the straps 58 is received over one of a pair of rollers 60 after which they are attached to one extreme end of one of a respective pair of lever arms 62. Each of the lever arms 62 has its other end joined to a respective one of a pair of film rails 64. The film rails 64 are elongated cylindrical rods having their longitudinal direction perpendicular to the long or optical axis of the camera 10. The film rails 64 are provided with a frictional surface about their exterior and each has a pivotal mounting 66 attached thereto with the pivotal mounting 66 on each of the film rails 64 being eccentrically mounted on the respective film rail 64 and with the eccentricity of the two film rails 64 being opposite. A spiral spring 68 is attached to each of the pivotal mountings 66 of the film rails 64 so as to cause the film rails 64 to be resiliently urged in a predetermined direction. The predetermined direction for the resilient pressure applied to each of the film rails 64 is selected so as to oppose the pulling force which could be applied to the film rails 64 by the strap 58 acting through the lever arms 62. A pair of pressure plate rails 70 are provided fixed in position respectively above and below the two film rails 64. A planar pressure plate 72 is provided behind the film 16 and is urged forwardly by a spring 74 located behind the pressure plate 72 so as to force the pressure plate 72 away from the back of the housing 12 of the camera 10.

In its operation, the optimization apparatus of the camera 10 functions to serve to align the image receiving surface of the camera 10, in the form of the film 16, with the lens image surface created by the optical system of the camera in a best fit or optimum manner. The origin of the problem creating the need for this adjustment, and the theory therebehind, is explained in more detail in U.S. Pat. No. 4,168,116 to the inventor herein. In contrast to the apparatus described in that patent, the apparatus herein serves to create an optimization between the lens image surface and the image receiving surface by moving the image receiving surface as opposed to by moving the lens image surface.

In its operation, the apparatus of FIG. 1 receives information as to the setting of the focusing collar 18 and the aperture selecting ring 20, as well as the optical characteristics of the lens assembly 14, by the position of the cam surface 22. The detecting device 24 functions to receive the information from the cam surface 22. The linkage 26 serves to respond to the position of the detecting device 24 to cause to adjusting mechanism 28 to operate in a preselected and predetermined manner. The adjusting mechanism 28 itself is the instrumentality which actually adjusts the image receiving surface, i.e., the film 16, to the position so as to achieve the best fit relationship between the image surface and the image receiving surface or film 16.

In the detecting device 24, the cam follower 30 is urged resiliently to move in a clockwise direction by the spring 36. This resilient urging of the spring 36 causes the cam follower 30 to constantly have its roller 32 pressed against the cam surface 22. Therefore, minor adjustments in the cam surface 22 will be transmitted by the roller 32 to the cam follower 30 causing the cam follower 30 to pivot in constant relationship thereto. In the linkage 26, the slide lever 40 is retained by the two retaining screws 44 received in the slot 42 so that the slide lever 40 may only slide forwardly and rearwardly in a linear direction. The biasing spring 46 constantly urges the slide lever 40 toward the cam follower 30 so that the abutment arm 48 is in constant contact with the linkage pin 38 of the cam follower 30. In this manner, minor adjustments of the cam surface 22 are reflected through the cam follower 30 to the slide lever 40. As the cam surface 22 is adjusted, the slide lever 40 moves forwardly and rearwardly so that its engaging surface 50 is positioned at a precise position within the range of movement of the slide lever 40 directly responsive to the position of the cam surface 22.

Figure 2:
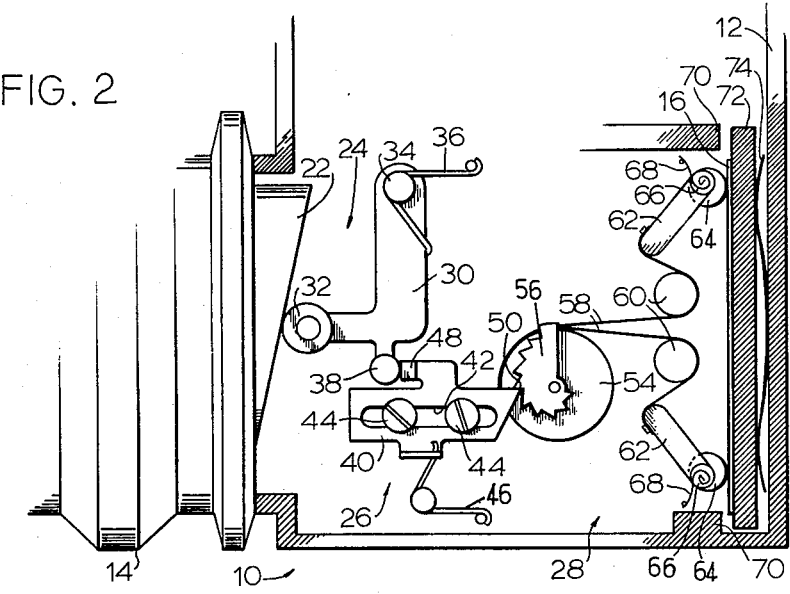
FIG. 2 is a view, similar to FIG. 1, of a portion of the camera of FIG. 1 illustrated with the apparatus positioned as it would be during operation of the optimization apparatus.

Following the tripping of the camera and prior to the shutter opening, it is envisioned that a spring loaded drive mechanism (not shown) attached to the drum 54 would be actuated. This drive mechanism would cause the drum 54 to be rapidly rotated in a counterclockwise direction to a position similar to that shown in FIG. 2. This rotation of the drum 54 would continue until the stop plate 56 contacts the engaging surface 50 of the slide lever 40. The spiral pattern of teeth on the stop plate 56 is designed so that the more forwardly the position of the slide lever 40, the greater the rotational movement of the drum 54 will be allowed, and the more rearwardly the position of the slide lever 40, the less the rotational movement of the drum 54 will be allowed. The rotation of the drum 54 causes the straps 58 to be pulled around the drum 54, and this pulling on the straps 58 causes the ends of the lever arms 62 to be pulled inward toward their positions as shown in FIG. 2. As can be seen in FIG. 2, this pulling on the lever arms 62 causes the film rails 64 to be pivoted about their pivotal mountings 66. Because the pivotal mountings 66 are oppositely eccentrically mounted relative to the film rails 64, the film rails 64 are moved rearwardly toward the pressure plate 72 pinning the film 16 against the pressure plate 72. This pivoting of the film rails 64 causes the pressure plate 72 to be pushed away from the pressure plate rails 70 against the force of the spring 74. Furthermore, the frictional surface formed on the exterior of the film rails 64 causes the film 16 to be stretched flat and held flat between the two film rails 64 and the pressure plate 72. After the shutter of the camera is opened and the film is exposed, the rotational force on the drum 54 is released, and the drum 54 would return to its position as shown in FIG. 1. This releasing of the drum 54 removes the pressure on the straps 58 and the spiral springs 68 attached to each of the pivotal mountings 66 on the film rails 64 would cause the film rails 64 to rotate back to their positions as shown in FIG. 1.

The apparatus as shown in FIGS. 1 and 2 accomplishes a result not heretofore possible in the prior art. In conventional automatic cameras, it is the usual practice that the photographer chooses either the exposure time or the aperture setting of the camera and the automatic mechanism controlling the camera "chooses" the other of the two settings. In cameras in which the camera automatically chooses the aperture setting, or f-stop, the setting of the f-stop may not be known until after the trip button is depressed. Accordingly, a device which seeks to optimize the relationship between the image surface and the image receiving surface of the camera which is dependent upon the aperture setting of the camera cannot be engaged until after the trip button is depressed. Therefore, such an optimization apparatus which depends on the adjustment of a focusing analog to achieve that optimization would not work in such an automatic camera inasmuch as the information necessary to adjust the analog depending upon the aperture setting would not be available until after the camera was tripped and the aperture setting selected. By contrast, in the apparatus according to the present invention, the detection of the position of the focusing collar 18 and the aperture selecting ring 20 is continually made by the apparatus through the use of the detecting device 24 at all times, and an adjustment can be made instantaneously after the trip button of the camera 10 is depressed. Thus, the adjustment to optimize the relationship between the image surface and the image receiving surface is automatically and instantaneously obtained following the tripping of the camera. The apparatus for accomplishing this function has a further advantage inasmuch as the frictional surfaces on the film rails 64 also serves to cause the film to be stretched tightly therebetween thereby avoiding any wrinkling or buckling of the film as might otherwise cause the film 16 to be less than perfectly flat. Because of both of these features, a more advantageous fit between the image surface and the image receiving surface, in the form of the film 16, is achievable then was heretofore possible to achieve in the prior art.

It is envisioned that this apparatus would also be usable in other types of cameras including those that do not use film as an image receiving surface, such as a television camera or similar device.

It is also envisioned that components of the apparatus according to the present invention may be utilized in any film camera to position and stretch flat the film during exposure of the film so as to avoid inaccuracies which may result from a non-planar film surface during exposure. In utilizing the apparatus of FIGS. 1 and 2 in such a camera, the components that would be utilized are primarily the components of the adjusting mechanism 28. In such an installation, the adjusting mechanism 28 would function as an operating mechanism to position the film 16 just prior to exposure thereof. The drum 54 would be arranged so that only a predetermined amount of pressure would be applied to the film 16 as it is pressed against the pressure plate 72 with that pressure being less than that of the spring 74. The drum 54 would, of course, be rotated clockwise to a retracted position so that the film 16 could be effortlessly wound between exposures thereof. The advantage in the use of such a mechanism would be that the film would be stretched tightly between the two film rails 64 and against the pressure plate 72 during exposure of the film so as to make sure that the film is held in a tight planar fashion so that no bends, bumps, wrinkles or other imperfections on the film surface could adversely affect the optical quality of the resulting picture. This apparatus could be included in any film camera in which it is desired that the film be held in such a planar fashion.

Figure 3:
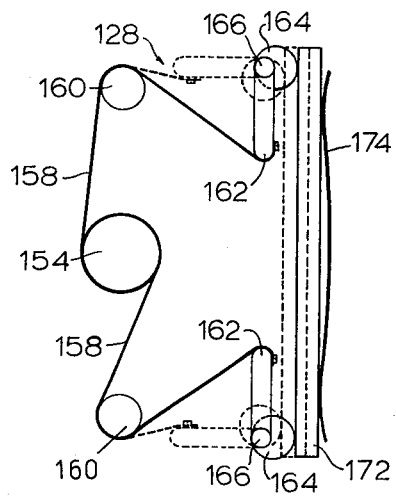
FIG. 3 is a schematic view of an alternative embodiment for an apparatus constructed in accordance with the present invention.

Shown in FIG. 3 is an alternate embodiment of an adjustment mechanism, generally indicated at 128, for use within a camera including therein apparatus according to the present invention. Elements of the adjusting mechanism 128 which are similar to corresponding elements of the adjustment mechanism 28 of FIGS. 1 and 2 are shown with similar reference numerals with a prefix added thereto, as is done in all of the other embodiments illustrated and described herein. In the embodiment of FIG. 3, the adjusting mechanism 128 includes a drum 154 having a pair of straps 158 attached thereto with the straps being fed over a pair of rollers 160 and attached to the ends of a pair of lever arms 162. Each of the lever arms 162 is secured at its other end to an eccentric mounting 166 each attached to a respective one of film rails 164. In the embodiment shown in FIG. 3, the film rails 164 do not directly contact the film, but rather contact the pressure plate 172. Biasing means, such as springs, would be provided for holding the film against the pressure plate 172, and thus an adjustment of the pressure plate 172 would result in an adjustment of the position of the film itself. It can be readily seen that the adjustment mechanism 128 of FIG. 3 operates in a similar manner to that shown in the adjustment mechanism 28 of FIGS. 1 and 2, with the selected pivoting of the drum 154 resulting in a pivoting of the film rails 164 and in a selective adjustment of the pressure plate 172 along a direction parallel to the optical axis of the camera.

Figure 4:
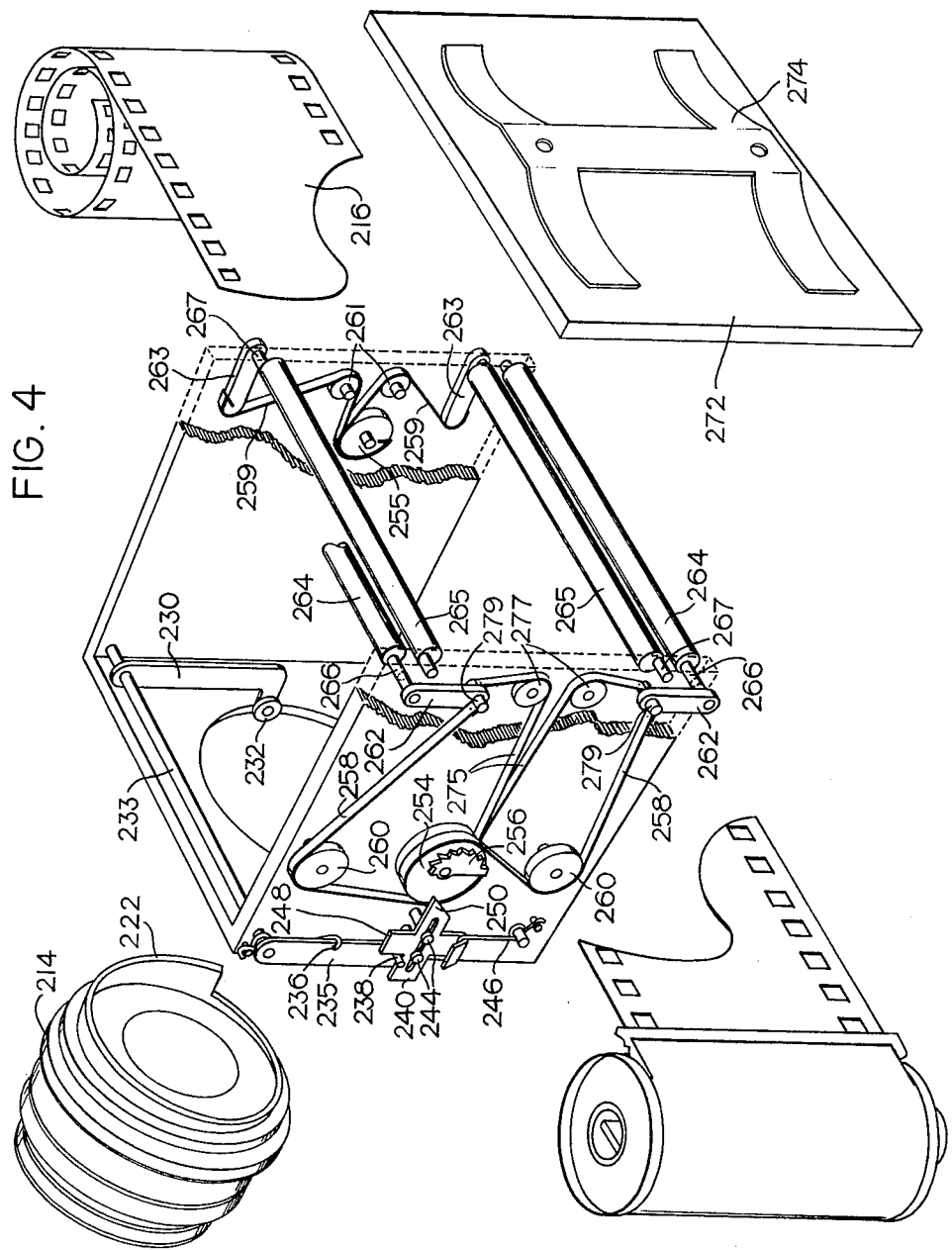
FIG. 4 is an exploded perspective view of a camera utilizing therein another alternative embodiment of an apparatus constructed in accordance with the present invention.

Shown in FIG. 4 is another alternative embodiment of an apparatus constructed in accordance with the present invention, including therein a pair of film rails 265 for engaging the film 216 and also a pair of pressure plate rails 264 for moving the pressure plate 272 to a predetermined position. As can be seen in FIG. 4, a cam follower 230 includes thereon a roller 232 adapted to engage a circular cam surface 22 on a lens assembly 214. The cam follower 230 includes a horizontal torsion bar 233 connected to a lever 235 which is engaged by a biasing spring 236, which is adapted to cause the roller 232 to follow the cam surface 222. The lever 235 depends downward from the torsion bar 233 and includes thereon a linkage pin 238 adapted to be engaged by a slide lever 240. The slide lever 240 includes a pair of retaining screws 244 adapted to allow the slide lever to slide forward and back and is biased by a spring 246 so that it always engages the linkage pin 238. An engaging surface 250 is provided at the opposite end of the slide lever 240 to engage a stop plate 256 provided on a drum 254. A pair of straps 258 are attached to the drum 254 and pass over a pair of rollers 260 before engaging lever arms 262 attached to the pressure plate rails 264. The straps 258 connect to the lever arms 262 by being attached to respective pins 279 secured to each of the lever arms 262. Also attached to the pins 279 are a pair of return straps 275 which pass over rollers 277 and are also attached at their other ends to the drum 254. On the opposite side of camera from the drum 254, a second drum 255 is provided which includes thereon a pair of straps 259 which pass over rollers 261 before they are attached to lever arms 263, which are in turn attached to eccentric pivotable mountings 267 attached to film rails 265. The drum 255 is not provided with an adjustable mechanism to adjust the extent of its rotation, but is instead spring biased so as to rotate with a predetermined force in the desired direction. The force applied to the drum 255 is arranged to be less than the force applied to the drum 254 and less than the force applied to the pressure plate 272 by the spring 274 for reasons that will become apparent.

In the apparatus of FIG. 4, adjustment provisions are provided to adjust the position of the pressure plate 272 and thereby the film 216. The eccentric mounting of the pressure plate rails 264 is configured such that the pressure plate rails 264 are normally engaging the pressure plate 272 and holding it at its maximum distance from the film rails 265. When the pressure plate rails 264 are in their normal, retracted position, as shown in solid lines in the cross-sectional view of FIG. 5, a maximum amount of freedom of movement is provided for the film 216 so that it may be advanced between exposures. After the trip button of the camera has been depressed, and the position of the cam 222 sensed by the cam follower 230, the drum 254 rotates to the predetermined position regulated by the position of the slide lever 240. The rotation of the drum 254 causes the upper one of the pressure plate rails 264 to rotate clockwise as viewed in FIG. 4 and the bottom of the two pressure plate rails 264 to rotate counterclockwise as viewed in FIG. 4. This permits the pressure plate 272 to be pressed by its biasing spring 274 toward the film rails 265 a predetermined distance as determined by the position of the cam 222. Simultaneously, the drum 255 is actuated, and the spring thereon is released so that the drum 255 pivots to cause the two film rails 265 to pivot eccentrically with the upper most of the two film rails 265 pivoting at a counterclockwise direction and the lowermost of the two rails 265 pivoting in a clockwise direction. This pivoting of the film rails 265 causes the film 216 to be pressed against the front surface of the pressure plate 272 and held firmly thereagainst. This configuration is illustrated in dashed lines in FIG. 5. The force of spring biasing the drum 255 is selected to be weaker than that of the biasing spring 274 so that the pivoting of the film rails 265 does not in any way affect the position of the pressure plate 272, but only presses the film 216 against the pressure plate 272 in its position as is determined by the rotation of the drum 254. The return straps 275 serve to return the pressure plate rails 264 to their retracted position when the drum 254 rotates back to its normal position. The film rails 265 may be provided with similar return straps or, alternatively, may be spring biased to a retracted position.

Figure 5:
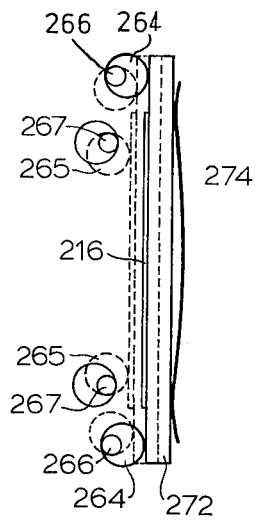
FIG. 5 is a side cross-sectional schematic view of the operation of the film rails of the apparatus of FIG. 4.

The apparatus of FIG. 4 and 5 is particularly adapted for cameras wherein it is desired that a large clearance be provided for the film during advancement of the film. This apparatus will also provide a more uniform stretching of the film between the film rails independent of the positioning of the pressure plate.

Figure 7:
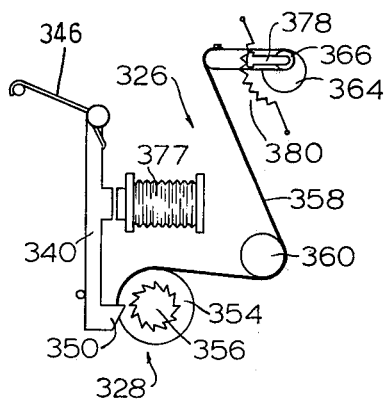
FIG. 7 is a schematic diagram of a linkage and an adjustment mechanism suitable for use with the detecting device illustrated in FIG. 6.
Figure 6:
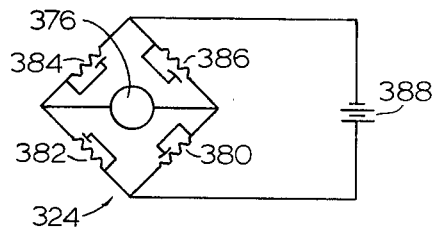
FIG. 6 is a schematic diagram of the detecting device of yet another alternative embodiment of an apparatus constructed in accordance with the present invention.

Shown in FIGS. 6 and 7 is yet another alternative embodiment for an apparatus according to the present invention, with the detecting device, illustrated at 324, shown in FIG. 6, and with the linkage, illustrated at 326, and the adjustment mechanism, illustrated at 328, both shown in FIG. 7. In the detecting device 324, a Wheatstone bridge circuit is shown including therein four variable resistors functioning as electric sensing devices. The variable resistor 380 is responsive to the position of the film rails as will be seen during the analysis of FIG. 7. The variable resistor 382 is constructed so as to give a resistance proportional to the focal length of the lens system of the camera. The variable resistors 384 and 386 are arranged so as to be respectively proportional to the aperature setting and the focus mechanism settings of the camera. The state of balance of the Wheatstone bridge is detected by a trigger circuit 376. The bridge circuit is biased in turn by a power supply 388. As can be seen in FIG. 7, an electromagnetic operator 377, in the form of a solenoid or relay, is controlled by the trigger circuit 376 and is adapted to control the operation of a stop lever 340 which is biased against the force of the electromagnetic operator 377 by a spring 346. The stop lever 340 includes an engaging surface 350 designed to engage one of the teeth in a stop plate 356 attached to a drum 354. A strap 358 attached to the drum 354 engages a roller 360 before engaging one end of a lever arm connected to a film rail 364. A follower 378 of conductive material is attached to the film rail 364 with the follower 378 also engaging the variable resistor 380. The combination of the follower 378 engaging the resistor 380 causes the resistor 380 to have a resistance proportional to the position of the film rail 364.

The operation of the apparatus illustrated in FIGS. 6 and 7 is similar to the operation of the apparatus illustrated in FIGS. 1 and 2 except that the detecting device and linkage 324 and 326 are electrical rather than mechanical components. The bridge in the sensing device 324 is constructed so that the trigger 378 will only be energized properly when the necessary balance is obtained between the aperture setting, as reflected in the resistor 384, the focus setting, as reflected in the resistor 386, the focal length of the camera, as reflected in the resistor 382, and the position of the film rail 364 as reflected by the resistor 380. When the appropriate balance is created by the motion of the film rail 364, the electromagnetic operator 377 is engaged to draw the stop lever 340 to engage the stop plate 356 to stop the rotation of the drum 354 to fix the film rail 364 in its position at that instant. It is possible by appropriate selection of the resistors 380 to 386 to provide any appropriate adjustment of the film rail 364. Obviously, because of the fact that the detecting and linkage mechanisms 324 and 326 are constructed to operate electrically rather than mechanically, the adjustment is instantaneously proportional to the position of both the f-stop setting and the focus setting and also always proportional to the focal length of the lens. Such an apparatus also benefits from the inherent reliability and longevity of electrical components.

It is understood that the present invention is not limited to the particular construction and arrangement of parts disclosed and illustrated herein, but embraces all such modified forms thereof as come within the scope of the following claims.

I claim:

1. In a camera having a lens assembly (14) including focus setting and aperture setting adjustment mechanisms (18, 20) and creating an image surface, and having an image receiving surface (16), apparatus for optimizing the image surface to the image receiving surface (16) comprising:
   a detecting device (24) responsive to the settings of the focus setting and aperture setting adjustment mechanisms (18, 20) for instantaneously detecting the position of said settings;
   a linkage (26) connected to the detecting device (24); and
   an image surface adjustment mechanism (28) operated by the linkage (26) to vary the position of the image receiving surface (16) relative to the lens assembly (14) to move the image receiving surface (16) to a best fit relationship with the image surface.

2. In a camera, the apparatus as claimed in claim 1 wherein the image receiving surface (16) is film and wherein the image surface adjustment mechanism (28) engages the film (16) and moves it into the desired position only just prior to exposure of the film.

3. In a camera, the apparatus as claimed in claim 1 wherein the detecting device includes a cam surface (22) positioned by the adjustment of the focus setting and aperture setting adjustment mechanisms (18, 20) in a position corresponding to the settings of those mechanisms, and a cam follower (30) which follows the motion of the cam surface (22).

4. In a camera, the apparatus as claimed in claim 3 wherein the cam follower (30) is resiliently biased by a spring (36) against the cam surface (22) and wherein a roller (32) is mounted on the cam follower (30) to engage the cam surface (22).

5. In a camera, the apparatus as claimed in claim 1 wherein the linkage (26) includes a slide lever (40) which is resiliently biased by a spring (46) so as to follow the motion of the detecting device (24).

6. In a camera, the apparatus as claimed in claim 1 wherein the adjustment mechanism (28) includes a pair of elongated film rails (64) which are each pivoted about an eccentric mounting (66), the film rails (64) positioned so as to move the image receiving surface (16) so that the position of the image receiving surface (16) is determined by the rotational position of the film rails (64).

7. In a camera, the apparatus as claimed in claim 6 wherein a spring (68) is attached to each of the film rails (64) to urge the film rails (64) to rotate in one direction.

8. In a camera, the apparatus as claimed in claim 6 wherein a pressure plate (72) is positioned behind the image receiving surface (16) and wherein a spring (74) is provided to resiliently bias the pressure plate (72) against the movement of the film rails (64).

9. In a camera, the apparatus as claimed in claim 8 wherein a pair of fixed pressure plate rails (70) are provided to limit the movement of the pressure plate (72).

10. In a camera, the apparatus of claim 8 in which the adjustment mechanism also includes a pair of eccentrically mounted, pivotable pressure plate rails (264) which engage the pressure plate (272) so as to control the position thereof, the film rails (265) positioning the image receiving surface (216) against the pressure plate (272) with the position of the pressure plate (272) as controlled by the pressure plate rails (264) being moved into the best fit relationship with the lens image surface.

11. In a camera, the apparatus as claimed in claim 6 wherein a lever arm (62) is attached to each of the film rails (64).

12. In a camera, the apparatus as claimed in claim 11 wherein the adjustment mechanism (28) also includes a rotatable drum (54) having a pair of straps (58) secured thereto, with the straps (58) also being each respectively attached to a one of the lever arms (62) so that the rotational position of each of the film rails (64) is controlled by the rotation of the drum (54).

13. In a camera, the apparatus as claimed in claim 12 wherein a stop plate (56) having a spiral shape and a series of teeth formed on its edge is formed on the drum (54) with the stop plate (56) arranged to be engaged by the linkage (26) to stop rotation of the drum (54).

14. In a camera, the apparatus as claimed in claim 1 wherein the detecting device (324) includes variable resistors (384, 386) responsive to the settings of the aperture setting and focus setting adjustment mechanisms.

15. In a camera, the apparatus as claimed in claim 14 wherein the linkage (326) includes an electromagnetic operator (377) actuated by the detecting device (324) to control positioning of the image receiving surface.

16. In a camera having been adapted to receive film (16) therein and having an optical axis, apparatus for positioning and holding the film (16) comprising:
- a pair of elongated film rails (64) positioned parallel to and spaced from each other and oriented perpendicular to the optical axis of the camera;
- a pivotal mounting (66) positioned at the end of each of the film rails (64) and arranged so that the surfaces of the film rails (64) are moved toward the film (16) as they are rotated;
- a pressure plate (72) on the opposite side of the film (16) from the film rails (64); and
- an operating mechanism (54, 58, 60, 62, 68) to selectively cause the film rails (64) to pivot about their respective mountings (66) so that the film rails (64) press the film (16) against the pressure plate (72).

17. In a camera, the apparatus as claimed in claim 16 wherein the film rails (64) are cylindrical and the pivotal mountings (66) are positioned eccentrically at the end of each of the film rails (64).

18. In a camera, the apparatus as claimed in claim 17 wherein each of the film rails (64) has a frictional outer surface and wherein the mountings (66) of the two film rails (64) are oppositely eccentric so that the film rails (64) tend to move apart as they are pivoted to stretch the film (16) therebetween.

19. In a camera, the apparatus as claimed in claim 16 wherein the operating mechanism includes a spring (68) attached to each of the film rails (64) to bias the film rails (64) to pivot in one direction.

20. In a camera, the apparatus as claimed in claim 16 wherein the operating mechanism includes a lever arm (62) attached to each of the film rails (64).

21. In a camera, the apparatus as claimed in claim 20 wherein the operating mechanism also includes having a rotating drum (54) and a pair of straps (58) having one end attached to the drum (54) and another end attached to a respective one of the lever arms (62) so that rotation of the drum (54) results in pivoting of the film rails (64).

22. In a camera having a lens assembly (14) including focus setting and aperture setting adjustment mechanisms (18, 20) and creating an image surface, and having an image receiving surface (16), apparatus for optimizing the image surface to the image receiving surface (16) comprising:
- electrical detecting devices (384, 386) instantaneously responsive to the settings of the focus setting and aperture setting adjustment mechanisms (18, 20) for creating electrical signals proportional to said settings;
- an electromagnetic operator (377) operated by the detecting devices (384, 386); and
- an adjustment mechanism (328) for moving one of the image receiving surface and the image surface into best fit relationship with the other, the extent of movement of the adjustment mechanism (328) being determined by the electromagnetic operator (377).

23. In a camera, the apparatus as claimed in claim 22 wherein the adjustment mechanism (328) moves the image receiving surface into best fit relationship with the image surface.

24. In a camera, the apparatus as claimed in claim 22 wherein the adjustment mechanism (328) includes a rotatable drum (354) and a pair of film rails (364) operated by the drum (354).

25. In a camera, the apparatus as claimed in claim 24 wherein the electromagnetic operator (377) is a solenoid arranged to stop rotation of the drum (354).

26. In a camera, the apparatus as claimed in claim 24 wherein a follower (378) is attached to at least one of the film rails (364) and an electrical detecting device (380) is connected to the follower (378) for detecting the position of the film rails (364).

27. In a camera, the apparatus as claimed in claim 26 wherein each of the electrical detecting devices (380, 384, 386) is a variable resistor.

28. In a camera, the apparatus as claimed in claim 22 wherein there is also an electronic sensing device (382) responsive to the focal length of the lens assembly of the camera.

* * * * *